United States Patent [19]
Bennett

[11] 3,998,121
[45] Dec. 21, 1976

[54] MITER CUTTING SAW
[75] Inventor: James C. Bennett, Calabasas Park, Calif.
[73] Assignees: B & E Products, Inc.; Ralph Sadler Rosen, both of Los Angeles, Calif.
[22] Filed: Feb. 3, 1976
[21] Appl. No.: 654,933
[52] U.S. Cl. .............................. 83/471.3; 83/477.1; 83/478; 83/490
[51] Int. Cl.² .................... B27B 5/18; B23D 45/14
[58] Field of Search ............. 83/471.2, 471.3, 471, 83/477.1, 477.2, 478, 490

[56] References Cited
UNITED STATES PATENTS

| | | | |
|---|---|---|---|
| 3,574,315 | 4/1971 | Boultinghouse | 83/490 |
| 3,672,251 | 6/1972 | Jagers | 83/490 X |
| 3,821,918 | 7/1974 | Niehaus et al. | 83/478 X |

Primary Examiner—Willie G. Abercrombie

[57] ABSTRACT

A power actuated miter saw has an adjustable rotatable mounting with respect to an elongated work holder so that the saw can be set in any one of a number of angular positions for the cut. The saw is lowered by a forward facing handle adjacent to which is a circular scale showing the angle. Mutually rotating parts have a 360° bearing ring between them near the perimeter to provide abundant stability and also seal the movable members to keep them free of dust. A sawdust discharge travels with the saw blade to collect and discharge sawdust generated by the operation in a direction away from the operator. The saw blade is guarded while at rest as well as during a cutting operation on the work.

12 Claims, 9 Drawing Figures

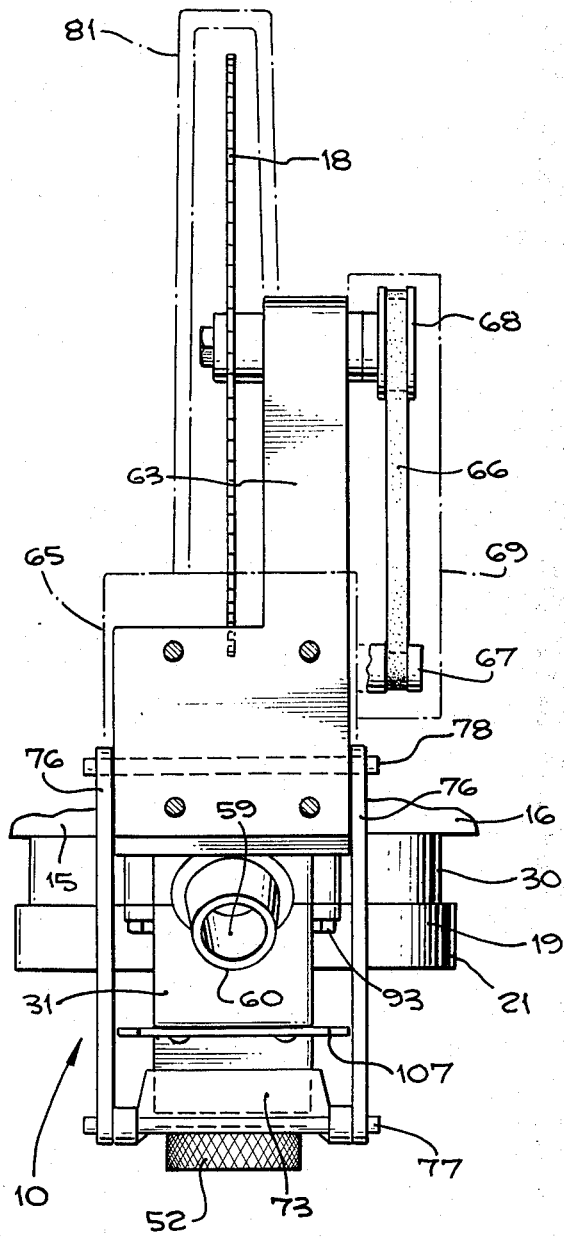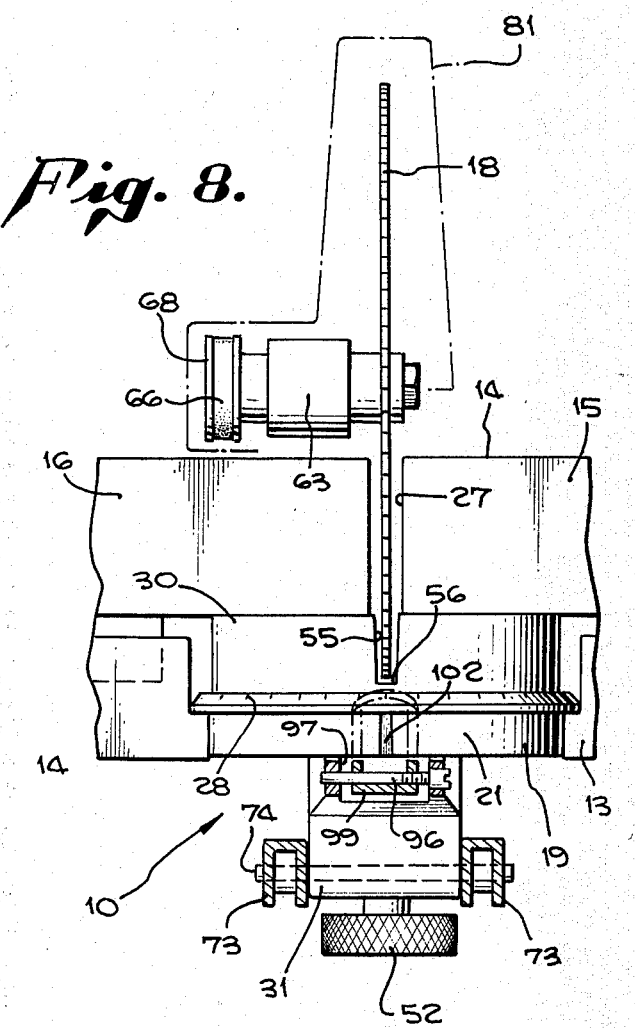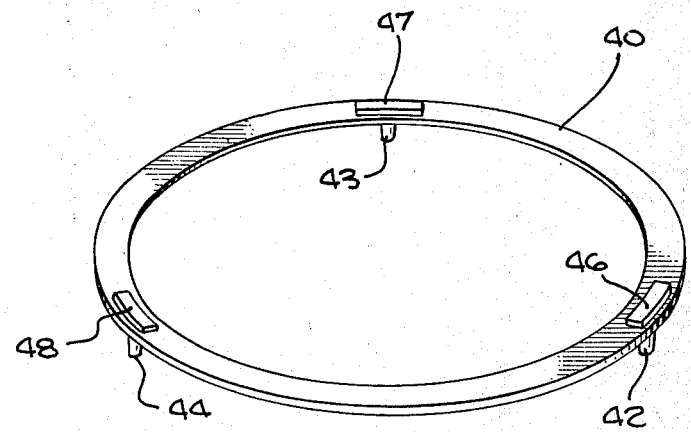

MITER CUTTING SAW

This is an improvement on U.S. Pat. No. 3,574,315. One of the problems which constantly faces manufacturers and users of power saw equipment is the need for keeping moving parts clean, and also to effectively dispose of the cuttings or sawdust as the case may be. Equipment of this kind, when set up for a handyman's operation, such as a home workshop, needs also to be small, compact, easily handled, thoroughly safe, and also of such character that it is within the budget of the average home workshop. Because such items of equipment are customarily of modest size permitting them to be mounted on a bench or table, it is helpful to have them so constructed that they cannot readily be overloaded and in any event, if overloaded, not subject to operation which would damage the equipment. Since persons operating such equipment often have no more than modest skill, and make no more than infrequent use of the equipment, safety features are especially important. Because servicing is a problem, it is highly advantageous to minimize the number of parts and confine relative movement of those parts which need to move to a scope no more than is necessary for customary average use.

It is therefore among the objects of the invention to provide a new and improved automatic, adjustable miter cutting saw which is both simple and compact in its construction and simple in its operation, and which is equally well adapted to both a miter cut and a cross-cut operation.

Another object of the invention is to provide a new and improved miter type cutting saw which by reason of the structural relationship of essential moving parts movement of the parts is stabilized so as to assure a positive dimensionally accurate cut when the machine is operated.

Another object of the invention is to provide a new and improved miter type cutting saw capable of employment as a bench tool where the operator has a clear-cut view of all operations which are performed unobstructed by the accumulation of sawdust and cuttings.

Still another object of the invention is to provide a new and improved miter cutting saw, the structure of which is especially adapted to collect cuttings as the operation of the saw progresses through a work piece and simultaneously sweep the cuttings or sawdust toward a discharge opening and then discharge the cuttings or sawdust in a direction away from the operation.

Still another object of the invention is to provide a new and improved miter cutting saw wherein a relatively simply constructed positioning structure for setting the cut at different angles carries with it a portion of the work support, the saw and motor, guards to avoid injury to the operator, and a manual actuator which move freely throughout the angular distance necessary for the average miter cut and which adequately protect the operator at all times.

Still another object of the invention is to provide a new and improved miter type cutting saw of such construction that it can virtually slice through the thickness of an average work piece while keeping the saw clear of the apparatus and wherein the shielding or guarding portions of the device cooperate with a cutting discharge arrangement in a way to constantly keep the saw cut both visually and physically clear of cuttings during the operation.

Still further among the objects of the invention is to provide a rugged, simple and substantially inexpensive miter type cutting saw having relatively few parts, assembled in compact arrangement and of such character that the device operates with an abundance of precision, while at the same time being one of relatively low cost.

With these and other objects in view, the invention consists of the construction, arrangement, and combination of the various parts of the device, whereby the objects contemplated are attained, as hereinafter set forth, pointed out in the appended claims and illustrated in the accompanying drawings.

In the drawings:

FIG. 7 is a rear elevational view on the line 7—7 of FIG. 1.

FIG. 8 is a front elevational view on the line 8—8 of FIG. 3.

FIG. 9 is a perspective view of the annular bearing ring adapted to be located between mutually rotating parts.

Figure 1:
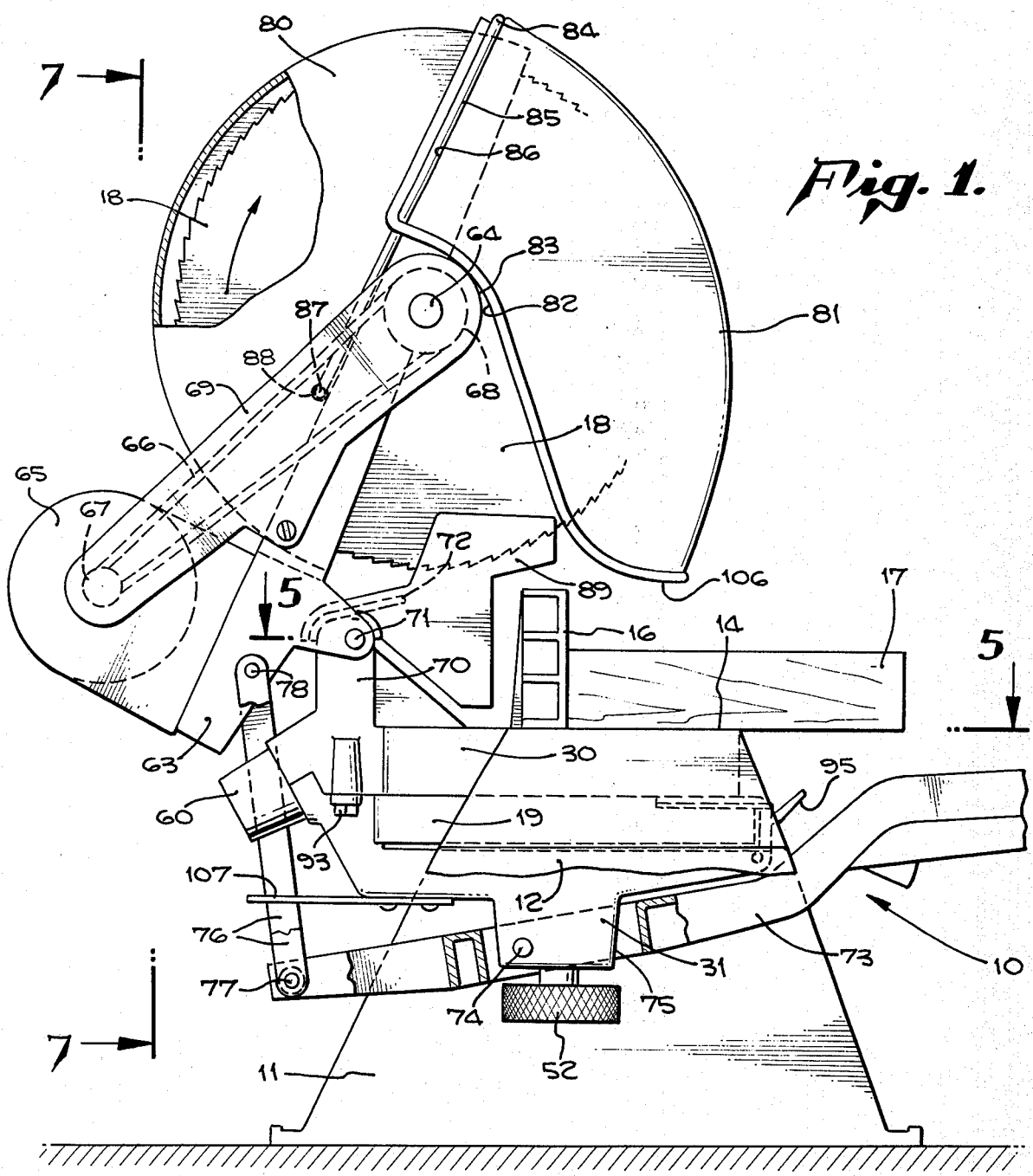
FIG. 1 is a side elevational view of the power actuated miter saw showing a work piece in position ready for cutting.
Figure 3:
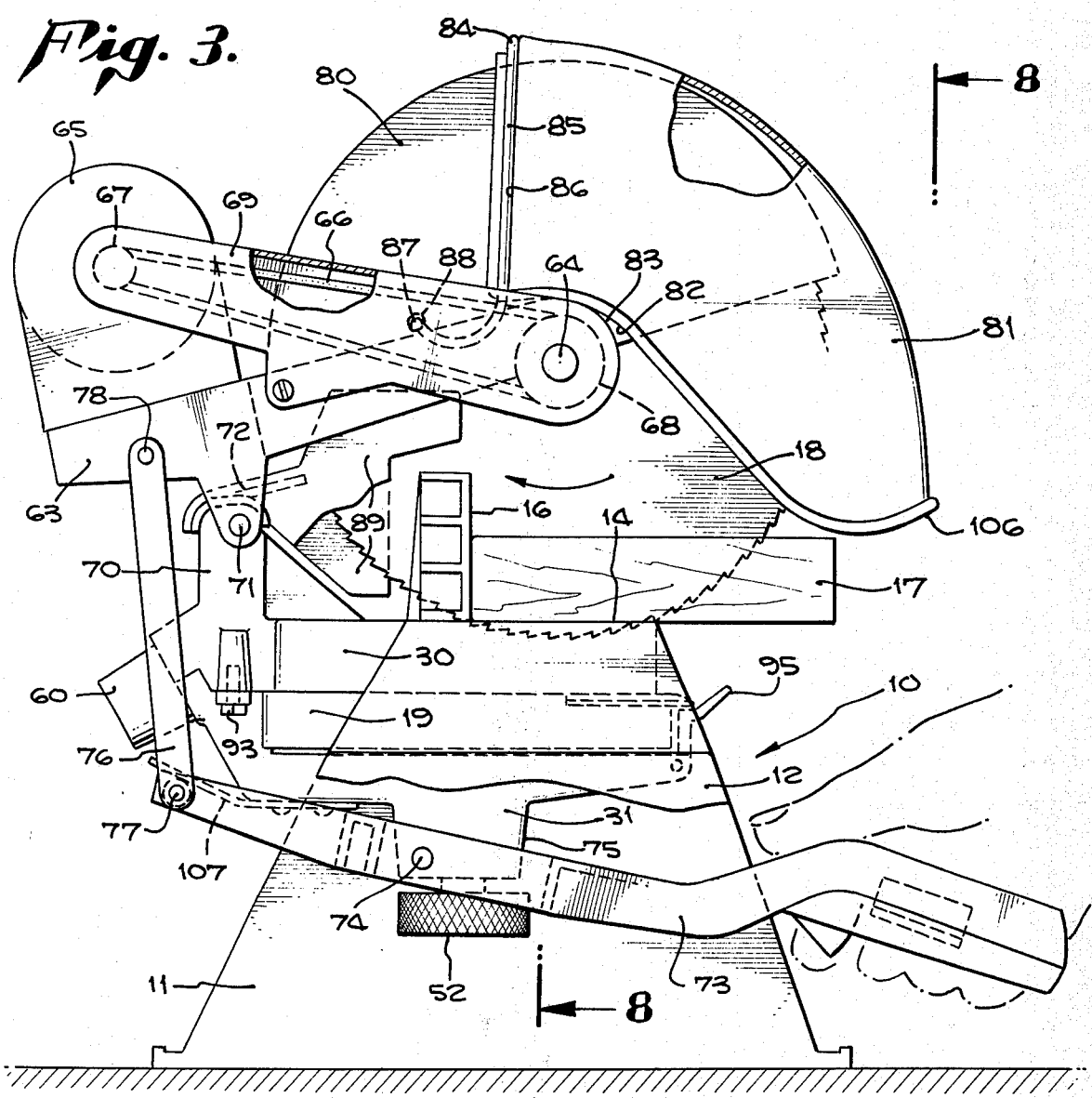
FIG. 3 is a side elevational view similar to FIG. 1 but showing the saw during a cutting operation through the work.

In an embodiment of the invention chosen for the purpose of illustration, there is shown a frame consisting of a horizontal work table assembly 10 and supported by legs 11 and 12. Actually the work supporting part of the work table assembly 10 is in two parts, namely, one part 13 over the leg 11 and another part 14 over the leg 12. Extending along the rear of the work table assembly is a work guide consisting of parts 15 and 16. The work table assembly is adapted to support a work piece 17 for cutting by use of a circular saw blade 18. The saw blade is adapted to be swung from an elevated position, removed from the work as shown in FIG. 1, downwardly through a cutting position as shown in FIG. 3, and further if need to be to sever one end of a work piece 17 from the other. There is a blade clearance 27 between parts 15 and 16.

Included among the stationary portions of the device as part of the work table assembly is a reference plate 19, a 90° segment 20 of which is graduated in degrees forming a scale 28.

Figure 4:
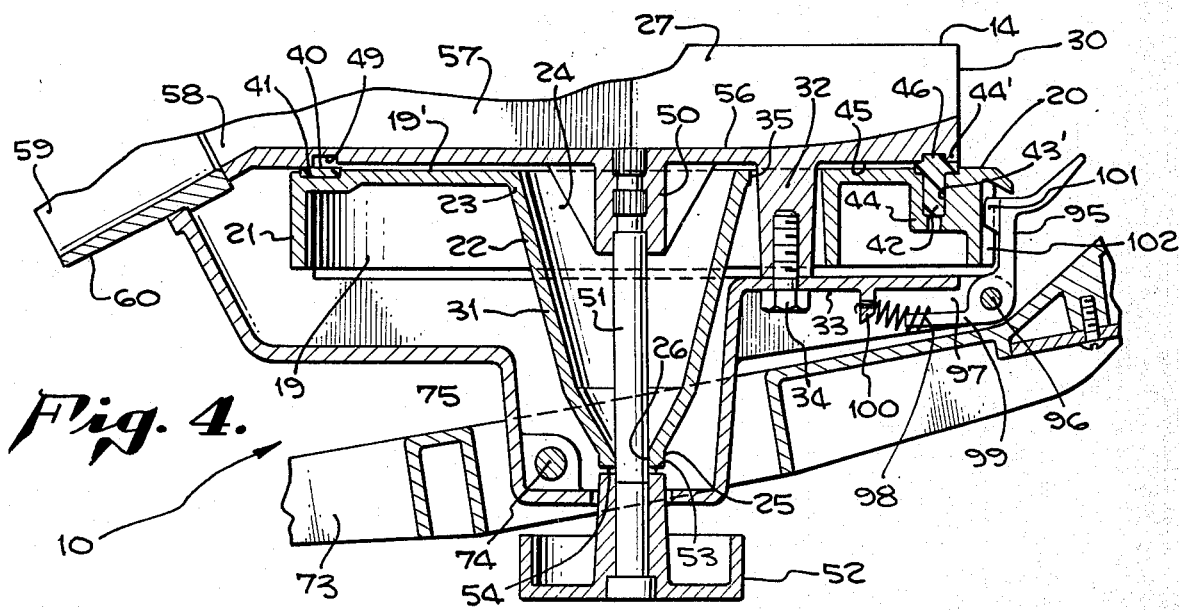
FIG. 4 is a longitudinal sectional view through the center.

The reference plate 19, substantially annular in form, has at its perimeter an annular stiffening flange 21. Centerably disposed with respect to the reference plate is a hub 22, as shown in FIG. 4, which has a relatively broad upper base, an annular edge 23 of which is part of the reference plate 19 and provides an opening 24. At its lower end 25 the hub is provided with a guide passage 26.

For purposes of description the reference plate may be considered as a miter station for the apparatus.

A substantial portion of the operating mechanism for the power operated miter saw is embodied in what may be termed a turntable or perhaps more appropriately a positioning structure which includes an upper, somewhat composite, work supporting plate 30 which overlies the reference plate 19 and its bearing platform 19'. A lower indexing structure 31 underlies the reference plate. These two plates are anchored together in part by provision of a boss 32, extending downwardly from the work supporting plate 30, as shown in FIG. 4, to engagement with a shelf 33 on the indexing structure 31 to which it is secured by a cap screw 34. In the reference plate 19 is an arcuate recess 35 which extends angularly for about 90° providing clearance for the boss 32 as the two plates 19 and 30 rotate through an arc of about 90° corresponding to the 90° segment scale.

The work supporting plate 30 actually rests upon and is carried by the reference plate 19 and its bearing platform 19' as the work supporting plate rotates through its arc of 90°. To accommodate the rotation there is provided a relatively flat bearing ring seal 40 shown in perspective in FIG. 9. To hold the bearing ring in position there is provided in the upper face of the reference plate 19 an annular recess 41 adjacent its outer perimeter, the recess in bearing ring being shown in section in FIG. 4. To anchor the bearing ring 40 so that it will not slide there are provided three bosses or extensions 42, 43, and 44. Complementary pockets, like the pocket 43' shown in FIG. 4, extend downwardly into enlargements 44 beneath the reference plate 19, and the bosses by extending into the respective pockets serve to anchor the bearing against rotation.

A downwardly facing peripheral rim 44' on a lower face 45 of the work supporting plate 30 serves as a bearing surface and rotates in engagement with the upper face of the bearing ring 40. To assist in anchoring the work supporting plate 30 centerably with respect to the bearing ring seal lugs 46, 47, and 48 projecting upwardly from the upper face of the bearing ring 40 are made use of. Extending upwardly into the lower face 45 is an annular recess 49 which accommodates the lugs permitting the lugs to slide freely in an arcuate path in the recess as the work supporting plate 30 rotates. In addition to providing a bearing the bearing ring and accompanying structure also serves as a seal to exclude cuttings, sawdust, and dirt from the space inwardly thereof, identified in part by the opening 24.

To additionally assist in centering the work supporting plate 30 with respect to the reference plate, there is provided on the lower side of the plate 30 a bushing 50 in which is anchored the upper end of the guide shaft 51. The lower end of the shaft rotates within the guide passage 26 at the lower end of the hub of 22. To hold the plate 30 downwardly with all parts of the bearing in engagement there is provided a hand wheel 52 fastened to the lower end of the shaft 51 by appropriate conventional means so that an upper edge 53 of the hand wheel is adapted to abut against a lower edge 54 of the hub 22.

Figure 5:
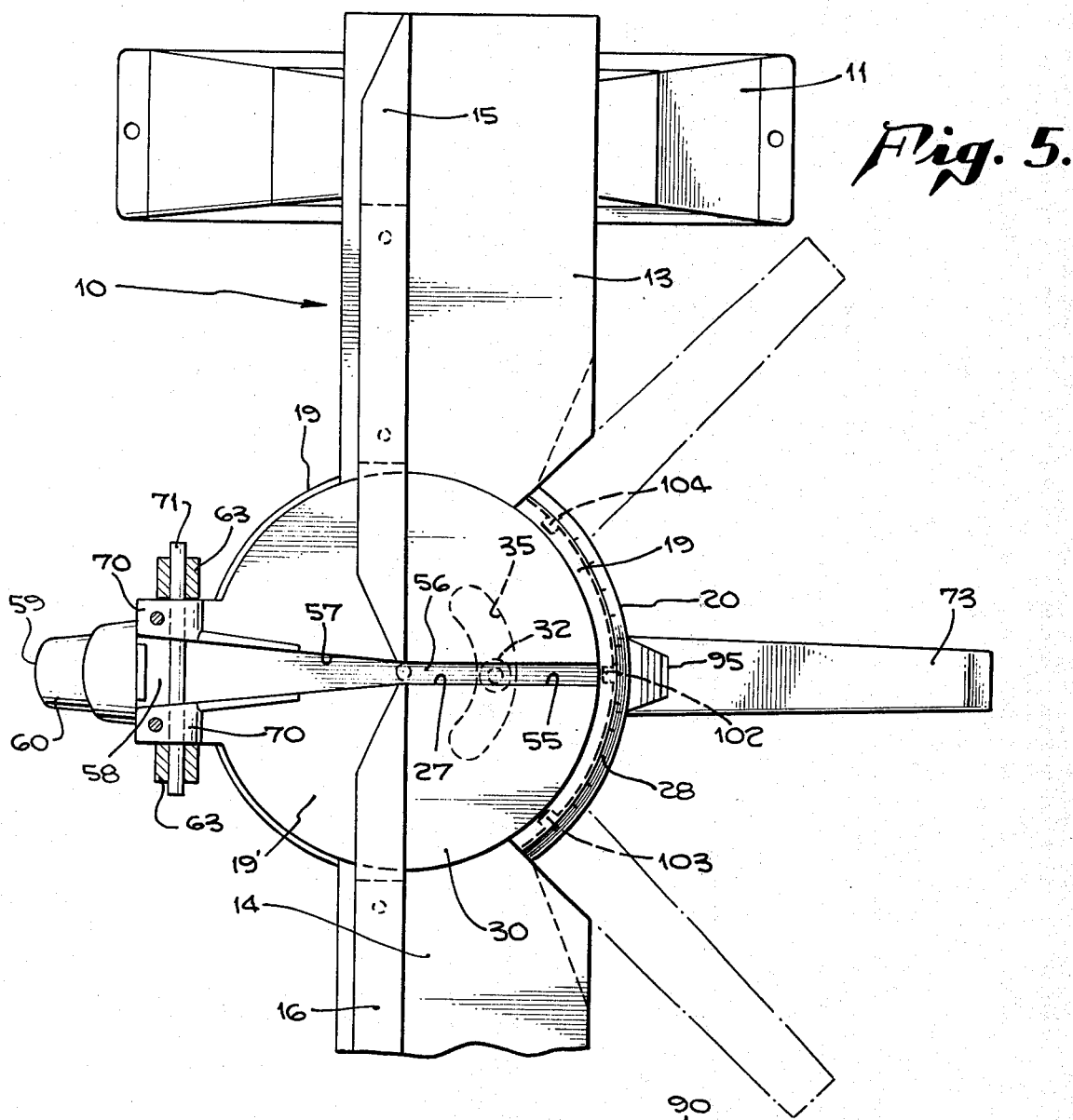
FIG. 5 is a partial plan view taken on the line 5—5 of FIG. 1.

Extending in a diametrical direction across the work supporting plate 30 is a saw slot 55 which extends almost through the work supporting plate 30 except for a bottom wall 56 of the saw slot. As shown in FIG. 5, the saw slot has a progressively outwardly expanding portion 57 on the side facing the rear of the plate. As sawdust or cuttings, as the case may be, are tossed rearwardly through the saw slot, they are caught in a discharge chute 58 and from there travel through a discharge orifice 59 in a discharge tube 60.

For mounting the saw there is provided a saw platform 63 on which the circular saw blade 18 is rotatably mounted on a shaft 64. An electric motor 65 is mounted at the rear end of the platform and drives the saw blade by means of a belt 66 traveling over pulleys 67 and 68. A guard 69 protects the pulleys and belt.

The saw platform 63 is tiltedly mounted on a bracket 70, about a horizontal pivot pin 71. The bracket is provided with a stiffening flange 72.

For moving the saw downwardly to the cutting position of FIG. 3, there is provided a manually actuated arm 73 which is pivotally mounted in a horizontal pivot pin 74, the pivot pin being retained in a downwardly projecting section 75 of the indexing structure 31, previously made reference to.

At the rear of the manually actuated arm is a lever 76 pivotally secured to the manually actuated arm by a pin 77 and pivotally secured to the saw platform 63 by a pin 78. The manually actuated arm 73 is relatively wide, spanning the section 75 and is provided with a clearance opening 79 which amply accommodates the section 75.

For protecting the operator the saw is provided with several guards. There is a fixed guard 80 which extends for about 180° over the upper half of the saw blade. A movable guard or shield 81, in a position at rest as shown in FIG. 1, extends over about 120° more or less of the remaining portion of the saw blade 18. The movable guard has opposite cam edges 82, the left hand edge 82 as shown in FIGS. 1 and 3 being adapted to ride over an arcuate surface 83 serving as a cam, which is part of the belt guard 69. The movable guard 81 is held in operative position by employment of a U-shaped spring 84, opposite legs 85 of which are anchored in an appropriate recess 86 at the rear edge of the movable guard 81. Turned in tips 87 of the spring 84 are anchored in appropriate holes 88 in opposite sides of the fixed guard 80.

Figure 6:
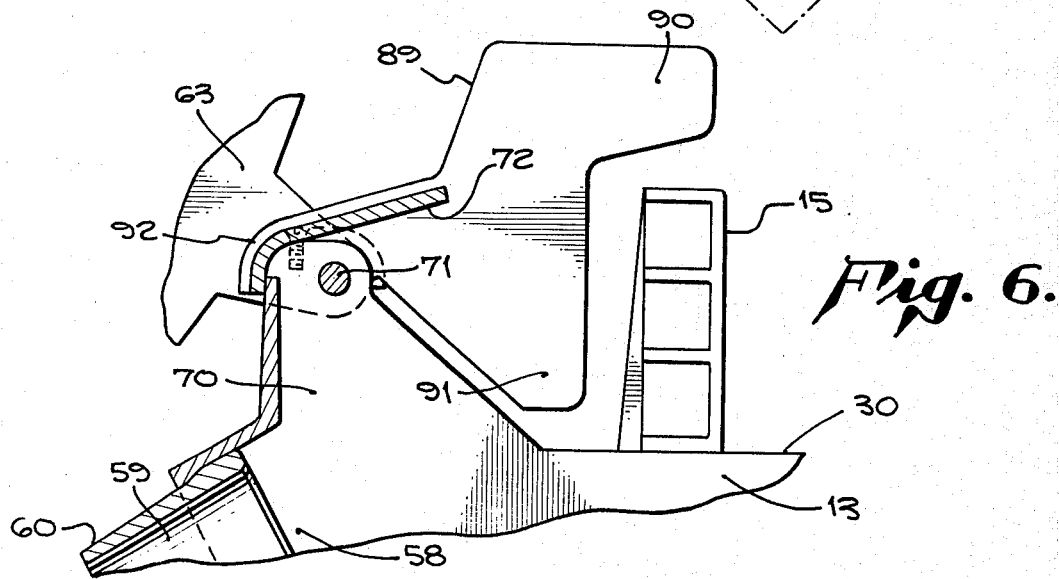
FIG. 6 is a fragmentary longitudinal sectional view showing one of the hand guards.

As a further feature there are provided hand guards 89, shown in some detail in FIG. 6. The hand guard has one arm 90 which extends over the work guide 15, 16, and a lower arm 91 which covers that portion of the saw blade which is exposed behind the work guide 15, 16. A rearwardly extending arm 92 is attached to the brackets 70 by means of the pivot pin 71, previously described.

The bracket 70 and also the work supporting plate 30 are fastened to the indexing structure 31 by appropriate bolts like the bolts 93 shown in FIGS. 1 and 3, as well as by means of the cap screw 34 previously described.

To hold the saw blade in a crosscut position, as shown for example in FIGS. 7 and 8, there is provided a trigger 95 which swings pivotally about a pivot pin 96 on a flange 97 of the shelf 33 of the indexing structure. A spring 98 acting between a keeper 99 on the trigger and the keeper 100 on the shelf 33 is biased normally to impress a catch 101 of the trigger into a 90° index slot 102 in the annular stiffening flange 21 of the reference plate 19. An index slot 103 may also be provided 45° removed towards the left, as viewed in FIG. 5. and another index slot 104 45° removed towards the right. The 45° removed positions are the usual miter positions. Additional index slots may be provided if preferred, or the operator may depend upon handholding the saw platform at any other angular disposition, as indicated by the degree scale 28 located on the 90° segment 20.

For a crosscut of the work piece 17 with the catch 101 lodged in the 90° index slot 102, it is necessary only for the operator to depress the forwardly extending end of the manual actuated arm 73. This tilts the saw blade 18 from the position shown in FIG. 1 downwardly toward the position shown in FIG. 3. As the saw blade approaches the work, a work contacting edge 106 of the movable guard 81 strikes the upper face of the work piece 17 and slides along it as the saw platform 63 and saw blade 18 advance through the work piece. By reason of the clockwise direction of rotation of the saw blade as pictured in FIGS. 1 and 3, sawdust is thrown towards the rear. As the saw blade cuts through the work piece 17 it enters the saw slot 55 and sawdust then is forced into the slot and toward the rear from which it passes outwardly through the discharge orifice 59.

Figure 2:
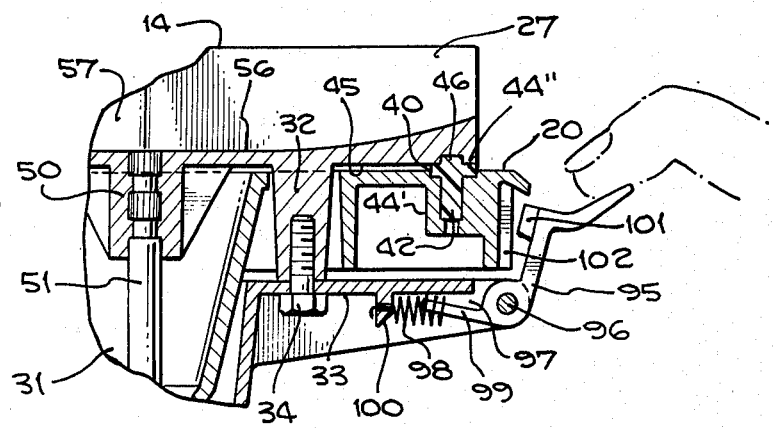
FIG. 2 is a fragmentary vertical sectional view through part of the bearing structure and showing parts needed for holding the setting at its selected angle.

When the saw is to be set for a 45° miter cut, the trigger 95 is pulled outwardly to the position shown in FIG. 2 by finger action, releasing it from the index slot. The manual actuating lever is then moved right or left, as the case may be, 45° to one of the index slots 103 or 104. As the manually actuated arm is rotated, so also is the indexing structure 31 and the work supporting plate 30. The saw platform travels at the same time as does also the motor and the saw mounted on it. At the same time the boss 32 is free to move through the arcuate recess 35 which, as previously described, has been provided for it in the stationary reference plate 19 and bearing platform 19'. Rotation of the rotating parts is well stabilized by reason of the captive structure of the bearing ring seal 40, as already described, assisted by the guide shaft 51. In any one of the positions of rotation, whether at the position 45° removed or any intermediate position, the saw platform and saw blade 18 are lowered in the same manner as previously described by depressing the forwardly projecting end of the manual actuated arm 73. The work contacting edge 106 is long enough so that it will ride over the upper face of the work piece 17 in any one of the positions. As the movable guard 81 is tilted upwardly by this action, the legs 85 of the U-shaped bracket 84 allow the guard to pivot upward to the position shown in FIG. 3. When saw blade and saw platform are returned upwardly to the original position, shown in FIG. 1, the weight of the guard will return the movable guard 81 to a complete blade protection position, closing the gap between the blade and the forwardly projecting arms 90 of the hand guards 89. Moreover, by employment of a spring 107 located at the rear of the indexing structure 31 positioned to be engaged by the rearmost end of the manual actuating arm 73 becomes operative as the blade approaches the work and serves to return the arm and the saw blade to elevated position when the manually actuated arm is released.

I claim:

1. In a power operated miter saw comprising a stationary frame, a horizontal work table on said frame having a miter station intermediate opposite ends, a saw positioning turntable structure having a pivotal mounting on said frame on a vertical axis at said miter station, a saw platform having a tiltable mounting on said positioning structure on a horizontal axis and a manual actuator for said platform accessible from the front of the frame, the combination of a reference plate having a stationary mounting on said frame concentric with said miter station and having a circular perimetrical edge spanning the work table and with an angle measurement scale extending over part of said perimetrical edge, said positioning structure comprising a work supporting plate overlying said reference plate, an indexing structure underlying said reference plate and a releasable trigger cooperable respectively with said indexing structure and said scale for setting the angle of said saw platform, and an annular bearing element between said plates adjacent the perimeters.

2. In a power operated miter saw as in claim 1, said annular bearing element providing a space between said plates, portions of said bearing element extending into adjacent faces of the respective plates whereby to seal off said space and provide lateral stability.

3. In a power operated miter saw as in claim 1, said reference plate comprising a bearing platform, a hub having an upper annular edge in supporting relationship with said bearing platform and a lower end having a guide passage therethrough, and a guide shaft on said work supporting plate extending through said hub and the guide passage therein.

4. In a power operated miter saw as in claim 3, wherein there is an adjusting knob at the lower end of said shaft exterior with respect to said indexing structure, said manual actuator comprising an arm having a pivotal mounting on the indexing structure and a vertical opening therethrough spanning said knob and a portion of said hub.

5. In a power operated miter saw as in claim 1, a spacing boss located between and attached respectively to said work supporting plate and said indexing structure, said reference plate having a transversely extending recess therein through which said boss extends whereby to enable rotation of said work supporting plate relative to said reference plate.

6. In a power operated miter saw as in claim 2, said work supporting plate having a diametrically extending saw slot between upper and lower faces thereof with a bottom of said slot separating the slot from said space.

7. In a power operated miter saw as in claim 6, said positioning structure having a sawdust discharge opening facing rearwardly and in alignment with said saw slot and adapted to travel with the saw slot as the indexing structure is moved from one position to another.

8. In a power operated miter saw as in claim 7, the entrance of the discharge opening having a substantially sealed relationship with the adjacent end and said saw slot having a size expanding progressively from the entrance rearwardly.

9. In a power operated miter saw as in claim 1, said reference plate having an annular stiffening flange at the outermost periphery extending in a downward direction.

10. In a power operated miter saw as in claim 9, said flange having index slots on the outer face, said trigger being pivotally mounted on the indexing structure and having positions of engagement with said index slots.

11. In a power operated miter saw as in claim 1, a rear transverse guide on said work table and laterally spaced hand guards on opposite sides of said saw platform and located rearwardly of said rear transverse guide.

12. In a power operated miter saw as in claim 1, a stationary saw guard comprising laterally spaced stationary sheets on said saw platform and a movable saw guard comprising laterally spaced movable sheets partially overlying said stationary sheets, a U-shaped spring element having captive ends of the legs anchored to said respective movable sheets and free ends of the legs bearing on said saw platform, said movable sheets having cam tracks at edges thereof overlying cam elements on respective sides of said saw platform.

* * * * *